United States Patent
George et al.

(10) Patent No.: US 7,248,580 B2
(45) Date of Patent: Jul. 24, 2007

(54) HARDWARE-ENFORCED LOOP-LEVEL HARD ZONING FOR FIBRE CHANNEL SWITCH FABRIC

(75) Inventors: William R. George, Minneapolis, MN (US); Frank R. Dropps, Maple Grove, MN (US)

(73) Assignee: QLogic Switch Products, Inc., Eden Prairie, MN (US)

( * ) Notice: Subject to any disclaimer, the term of this patent is extended or adjusted under 35 U.S.C. 154(b) by 1008 days.

(21) Appl. No.: 10/310,653

(22) Filed: Dec. 5, 2002

(65) Prior Publication Data

US 2003/0179748 A1   Sep. 25, 2003

Related U.S. Application Data

(63) Continuation of application No. PCT/US01/18159, filed on Jun. 5, 2001.

(60) Provisional application No. 60/209,413, filed on Jun. 5, 2000.

(51) Int. Cl.
*H04L 12/56* (2006.01)
(52) U.S. Cl. .......................... 370/389; 707/9; 709/223
(58) Field of Classification Search ................ 370/351, 370/389, 466, 254; 709/223
See application file for complete search history.

(56) References Cited

U.S. PATENT DOCUMENTS 4,162,375 A   7/1979 Schlichte ..................... 179/15

(Continued)

FOREIGN PATENT DOCUMENTS

EP   0649098   9/1994

(Continued)

OTHER PUBLICATIONS

Anderson, T M., et al., "High Performance Switch Fabric Element and Switch Systems", U.S. Appl. No. 10/752,390, a Continuation of U.S. Appl. No. 09/346,793, filed Jul. 2, 1999.

(Continued)

*Primary Examiner*—Chi Pham
*Assistant Examiner*—Albert T. Chou
(74) *Attorney, Agent, or Firm*—Schwegman, Lundberg, Woessner & Kluth, P.A.

(57) ABSTRACT

Hardware-enforced zoning is provided in Fibre Channel switches to protect against breaching of assigned zones in a switch network which can occur with software-based zoning techniques. The invention provides logic for performing a hardware-based validation of the Source ID S_ID of frames both at the point where the frame enters the Fibre Channel fabric, and at the point where the frame leaves the fabric. The S_ID is verified against an inclusion list or table of allowable S_IDs, which can be unique for each fabric port. The invention provides a way to increase the range of sources an inclusion table can express, by implementing wild cards, on an entry-by entry basis. If the S_ID is valid, it will enter the fabric and route normally. If invalid, the frame will not be routed but will be disposed of by the fabric according to FC rules. This prevents incorrect S_IDs from breaching the table-driven zoning at the point where frames exit the fabric, to prevent unauthorized access to devices connected to the switch network.

12 Claims, 6 Drawing Sheets

Fabric Cloud S_ID Validation Points

U.S. PATENT DOCUMENTS

| | | | |
|---|---|---|---|
| 4,425,640 A | 1/1984 | Philip et al. .................. 370/58 |
| 4,546,468 A | 10/1985 | Christmas et al. ............ 370/54 |
| 4,569,043 A | 2/1986 | Simmons et al. ............. 370/63 |
| 4,725,835 A | 2/1988 | Schreiner et al. ...... 340/825.83 |
| 4,821,034 A | 4/1989 | Anderson et al. ........... 340/825 |
| 5,144,622 A | 9/1992 | Takiyasu et al. ......... 370/85.13 |
| 5,367,520 A | 11/1994 | Cordell ........................ 370/60 |
| 5,598,541 A | 1/1997 | Malladi ...................... 395/286 |
| 5,610,745 A | 3/1997 | Bennett ...................... 359/139 |
| 5,633,867 A | 5/1997 | Ben-Nun et al. |
| 5,687,172 A | 11/1997 | Cloonan et al. ............ 370/395 |
| 5,748,612 A | 5/1998 | Stoevhase et al. .......... 370/230 |
| 5,818,842 A | 10/1998 | Burwell et al. ............. 370/397 |
| 5,987,028 A | 11/1999 | Yang et al. .................. 370/380 |
| 5,999,528 A | 12/1999 | Chow et al. ................ 370/365 |
| 6,014,383 A | 1/2000 | McCarty ..................... 370/453 |
| 6,021,128 A | 2/2000 | Hosoya et al. .............. 370/380 |
| 6,047,323 A | 4/2000 | Krause ........................ 709/201 |
| 6,081,512 A | 6/2000 | Muller et al. ............... 370/256 |
| 6,118,776 A * | 9/2000 | Berman ....................... 370/351 |
| 6,128,292 A | 10/2000 | Kim et al. ................... 370/356 |
| 6,160,813 A | 12/2000 | Banks et al. ................. 370/422 |
| 6,185,203 B1 | 2/2001 | Berman |
| 6,289,386 B1 | 9/2001 | Vangemert |
| 6,308,220 B1 | 10/2001 | Mathur ........................ 709/238 |
| 6,324,181 B1 | 11/2001 | Wong et al. ................. 370/403 |
| 6,330,236 B1 | 12/2001 | Ofek et al. .................. 370/369 |
| 6,411,599 B1 | 6/2002 | Blanc et al. ................. 370/219 |
| 6,424,658 B1 | 7/2002 | Mathur ........................ 370/429 |
| 6,449,274 B1 | 9/2002 | Holden et al. ............... 370/392 |
| 6,470,007 B1 * | 10/2002 | Berman ....................... 370/351 |
| 6,484,173 B1 * | 11/2002 | O'Hare et al. ................. 707/9 |
| 6,597,691 B1 | 7/2003 | Anderson .................... 370/360 |
| 6,647,019 B1 | 11/2003 | McKeown et al. |
| 6,697,359 B1 | 2/2004 | George ........................ 370/357 |
| 6,839,747 B1 * | 1/2005 | Blumenau et al. .......... 709/223 |
| 6,904,053 B1 * | 6/2005 | Berman ....................... 370/466 |
| 6,980,525 B2 * | 12/2005 | Banks et al. ................. 370/254 |
| 7,165,152 B2 * | 1/2007 | Blumenau et al. .......... 711/152 |
| 2001/0038628 A1 | 11/2001 | Ofek et al. .................. 370/392 |
| 2003/0016683 A1 | 1/2003 | George et al. |
| 2004/0028038 A1 | 2/2004 | Anderson .................... 370/386 |

FOREIGN PATENT DOCUMENTS

| | | |
|---|---|---|
| EP | 0856969 | 1/1998 |
| WO | WO-98/36537 | 8/1998 |

OTHER PUBLICATIONS

Clark, Tom, "Zoning for Fibre Channel Fabrics", *Vixel Corporation Paper—XP002185194*, (Aug. 1999), 1-6.

Malavalli, Kumar, et al., "Distributed computing with fibre channel fabric", *Proc. of the Computer Soc. Int'l Conf.*, Los Alamitos, *IEEE Comp Soc. Press., vol. Conf. 37, XP000340745*, (Feb. 1992), pp. 269-274.

Martin, Charles R., "Fabric interconnection of fibre channel standard nodes", *Proceedings of the SPIE*, (Sep. 1992), pp. 65-71.

Yoshida, Hu, "LUN Security Considerations for Storage Area Networks", *Hitachi Data Systems Paper—XP002185193*, (1999), pp. 1-7.

Clark, Tom, "Zoning for Fibre Channel Fabrics", *Vixel Corporation Paper—XP002185194*, 1-6.

Yoshida, Hu, "LUN Security Considerations for Storage Area Networks", *Hitachi Data Systems Paper—XP002185193*, 1-7.

* cited by examiner

Source Zone Mask

| Loop Zone n | • • | Loop Zone 4 | Loop Zone 3 | Loop Zone 2 | Loop Zone 1 | Loop Zone 0 |
|---|---|---|---|---|---|---|

FIGURE 8
Destination Zone Mask
| Loop Zone n | • • | Loop Zone 4 | Loop Zone 3 | Loop Zone 2 | Loop Zone 1 | Loop Zone 0 |
|---|---|---|---|---|---|---|
FIGURE 9
Hard Zoning State Machine
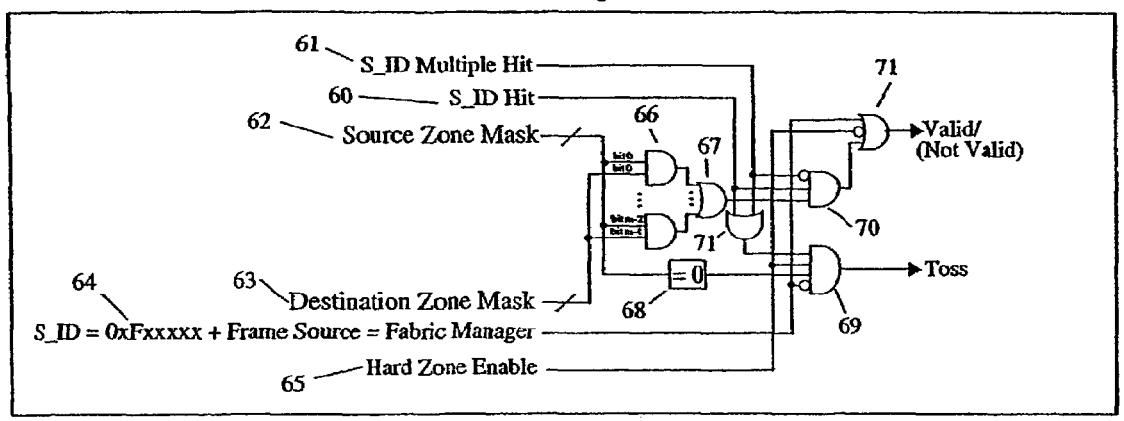
FIGURE 10
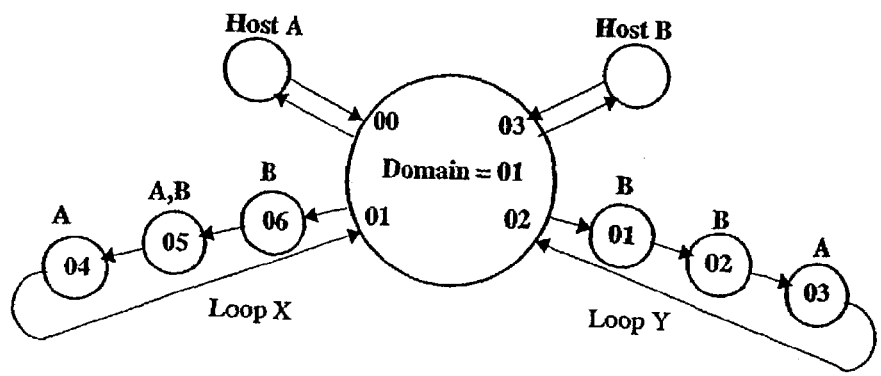

HARDWARE-ENFORCED LOOP-LEVEL HARD ZONING FOR FIBRE CHANNEL SWITCH FABRIC

CROSS-REFERENCE TO RELATED APPLICATIONS

This application is a continuation under 35 U.S.C. 111(a) of PCT/US01/18159, filed Jun. 5, 2001, which claims priority to U.S. Provisional Patent Application Ser. No. 60/209,413, filed Jun. 5, 2000, which applications are incorporated herein by reference.

FIELD OF THE INVENTION

This invention pertains generally to the field of high performance switching, and in particular to improvements in Fibre Channel switching to provide the establishment of zones for permitted access to connected devices, with hardware-enforcement of the zoning.

BACKGROUND OF THE PRIOR ART

The Fibre Channel standard has been established to provide for high performance switching solutions for computing and data handling systems. Examples of applications where the high speed and high bandwidth of Fibre Channel switches may be used to advantage include interconnecting computers and high-performance storage devices, interconnecting computers in multiple-computer operating environments, and anywhere multiple high-speed data interconnections must be established between designated nodes or groups of nodes in data handling networks.

The Fibre Channel standard, ANSI X3.T11, broadly defines classes and standards of function and performance, but does not dictate the implementation technologies to be used in providing these functions. A particular design of a switch to implement Fibre Channel functions is referred to as the 'fabric' of the switch. As this invention is directed to improvements in Fibre Channel switches, the description of the invention herein uses terminology and other defined terms from the field of Fibre Channel (referred to by the notation "FC" below) switches, and the FC standard may be consulted for definitions.

For data integrity and security reasons, it is necessary in some networks to make certain that certain hosts or devices have controlled access. For example, certain hosts may be allowed access to only certain storage devices, and vice versa. This requirement means that certain channels or groups of channels to which the affected hosts or devices are attached must be isolated from communication to or from other channels or groups of channels. Zoning techniques are used in prior art systems to define zones of addresses that will be considered valid for various sources or destinations connected to a switch.

Soft Zoning: The Problem

A problem with Fibre Channel zoning as it presently exists is that it is software-enforced zoning, often referred to as soft zoning. In soft zoning, devices connected to N_Ports and NL_Ports of the FC fabric login to the fabric and make queries of the Name Server to determine which of the remote devices this device can communicate with, along with their FC addresses (D_IDs). The Name Server defines and enforces the zones by listing in the login response the set of devices (by D_ID) that are in the login requester's zone or zones. In this manner, devices honor zones by using only those D_IDs given out by the Name Server.

However, this works only if all devices follow the rules, and there are no hardware failures. Soft zoning can be breached in the following ways.

Zones can be breached inadvertently by HBA software errors that generate incorrect D_IDs.

Zones can be breached by hardware failures, where the D_ID is corrupted somewhere between the source device and the destination device.

Zones can be breached deliberately by ill-mannered but non-malicious HBAs, such as those that walk through all D_IDs to discover where other HBAs are attached.

Zones can be breached maliciously by HBAs where the intent is to disrupt a system.

SUMMARY OF THE INVENTION

The present invention solves the problems discussed which are inherent with soft zoning systems by providing hardware-enforced zoning, also referred to herein as hard zoning. Hard zoning prevents breaching of assigned zoning by the accidental or intentional soft zoning problems discussed above, thereby improving system data integrity and security.

Hard zoning solves the soft zoning problems by using a hardware check of the frame's Source ID (S_ID) both at the point the frame enters the fabric, and at the point the frame leaves the fabric.

As shown in FIG. 1, according to the invention, the frame S_ID is validated at the point the frame enters the fabric (at an F_Port or FL_Port, but not an E_Port) to prevent incorrect S_IDs from breaching the table-driven zoning at the point where frames exit the fabric. If the S_ID is valid, it will enter the fabric and route normally. If invalid, the frame will not be routed but will be disposed of by the fabric according to FC rules.

The frame S_ID is validated at the point the frame exits the fabric (at an F_Port or FL_Port, but not an E_Port), to insure that the frame, based on the S_ID, is part of the zone or zones that the attached N_Port or NL_Port belongs to. Frame S_IDs are compared against a list of S_IDs that are valid for that port, where the size of the list is implementation-dependent, and where each entry defines a source that is allowed to transmit frames to this destination. If the S_ID matches an entry in the list, it is routed out of the fabric to the destination. If the S_ID does not match any entry in the list, the frame is not passed to the destination, but is disposed of by the fabric according to FC rules.

This method works both for fabric clouds containing homogenous switch devices connected together by E_Ports, and clouds containing heterogeneous switch devices connected together by E_Ports, providing all switch devices use S_ID-based hard zoning in the manner described above.

The method also partially works when some heterogeneous devices are equipped with S_ID hard zoning and others are not. In this case, the devices so equipped are offered full hard zoning protection except from frames entering the fabric from devices not so equipped, whose S_ID is incorrect.

The method also works when in devices so equipped, some fabric ports are deliberately excluded from hard zoning protection, producing a deliberate half-duplex hard zoning case. This can be done to work around the limitations of the Hard Zoning S_ID Inclusion List, which has a finite range.

The hard zoning methods and switches of the present invention provide a number of advantageous features, which include the following:

- The methods and techniques of the present invention provides a form of hard zoning in a switch fabric that is performed by hardware verification of frame S_IDs against an inclusion list of allowable S_IDs, before the frame is allowed to exit the fabric.
- The invention allows multiple overlapping hard zones for any destination (N_Port or NL_Port) across the largest of FC fabrics. The S_ID inclusion list is based on 24-bit addresses, allowing zones to be comprised of any nodes within the entire Fibre Channel 16,777,216 address space.
- The invention allows multiple overlapping hard zones to be implemented at the finest FC addressing granularity, which is down to the loop device, both at the frame source and the frame destination, where each of the 126 possible nodes on a loop can express unique zone characteristics.
- The invention accomplishes hard zoning at a fabric destination port (F_Port or FL_Port) by an Inclusion Table, unique to each fabric port, of legal S_ID values. The Inclusion Table is used by hardware to pass legal frames, and bar illegal frames. This mechanism guards against intentional and un-intentional zone boundary violations.
- The invention implements the Inclusion Table as a programmable hardware table, implemented as a CAM, containing multiple entries, each entry containing a 24 bit S_ID value, along with various comparison controls. A single entry typically represents a single source, such as an N_Port attached to an F_Port, or an NL_Port attached to an FL_Port.
- The invention provides a way to increase the range of sources an Inclusion Table can express, by implementing wild cards, on an entry-by entry basis, which can disable the comparison of the Port value, or the Port and Area values, of the S_ID. A single entry can then express all Ports within an Area, or all Ports and Areas within a Domain.
- The invention allows the flexibility of ranges to increase, by implementing exceptions to a range. A single entry defines the range, and one or more entries define exceptions to the range.
- The invention prevents zone breaching via false S_IDs, by implementing S_ID validation against the ports native ID as frames enter the fabric. Valid S_IDs route normally, invalid S_IDs are not routed.
- The invention allows an F_Port and its attached N_Port to belong to as many zones as the S_ID inclusion list allows.
- The invention allows multiple zones per loop, and overlapping zones on a loop. The number of zones supported on a loop is variable (n), is at least 2, and may be as high as requirements allow. Any loop device (based on Port or AL_PA) can belong to 1 to n zones.
- The invention's restrictions on the total number of zones on an F_Port, or the total number of zones on a loop, does not place restrictions on the total number of zones in a fabric.
- The invention works across fabrics comprising a single switch element (Domain), fabrics comprising multiple homogeneous switches connected together by E_Ports, and across fabrics comprising heterogeneous switches connected together by E_Ports.
- The invention allows certain frame types to be unaffected by zoning. Frames with FC Well-Known S_IDs, and any frame sourced by the fabric itself, are excluded from zoning, i.e., they will always route.
- The invention allows known "ill-mannered" S_IDs to be recognized in hardware, allowing a different disposition for these frames, such as immediate tossing rather than being processed as an exception by the fabric manager.
- The invention applies both to duplex zoning, where bidirectional traffic hard zoning is enforced on both ends, and half-duplex zoning where hard zoning is enforced on one end but not the other. Half-duplex zoning can solve limitations of the S_ID Inclusion Table for some topologies, and is a requirement when a fabric cloud contains multiple switch types, where some employ hard zoning and others do not.

BRIEF DESCRIPTION OF THE DRAWING

FIG. 8 is a diagram showing the Destination Zone Mask format;

FIG. 9 is a block diagram of the Hard Zoning State according to one aspect of the invention;

FIG. 10 is a diagram of an example (Example A) of the use of the invention in connecting multiple hosts to multiple storage devices, with hard zoning;

DETAILED DESCRIPTION OF THE PREFERRED EMBODIMENTS

The overall operation of S_ID validation is discussed above with reference to FIG. 1. Detailed operation is described below with reference to the Figures and tables.

Source Fabric Port S_ID Validation

Figure 1:
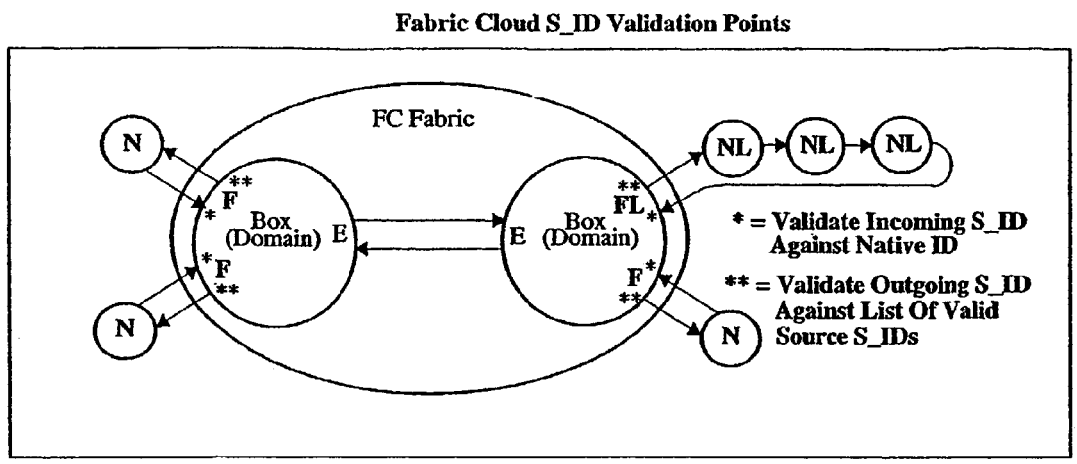
FIG. 1 is a symbolic representation of a FC fabric cloud, showing S_ID validation points according to one aspect of the invention.
Figure 2:
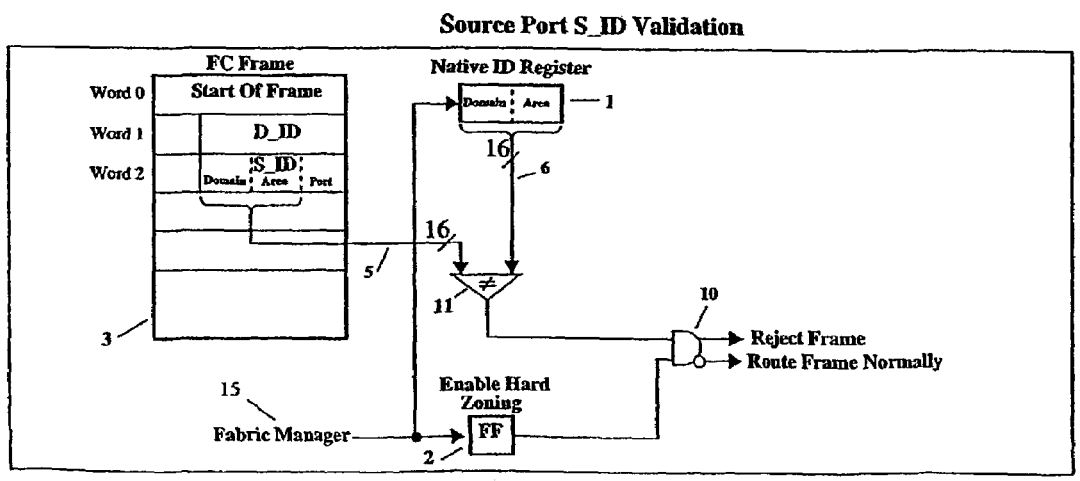
FIG. 2 is a block diagram of a portion of a fabric showing source port S_ID validation according to one aspect of the invention.

FIG. 1 shows the technique for source fabric port S_ID validation. This ensures that incoming frame S_ID values are legal, in order that the Hard Zoning mechanism will be effective. This feature requires an enable/disable control, because it should be enabled only on F_Ports and FL_Ports, but not on E_Ports.

The Native ID register (1) is resident to the fabric port logic, and is typically written by the fabric manager (15) to whatever ID has been chosen for the port, but may be hard-wired into the logic in a simpler design with greater operating restrictions. The Native ID is the Domain and Area of the F_Port or FL_Port. The Enable Hard Zoning FF (2) is also resident to the fabric port logic and written by the fabric manager (15), which enables the feature on F_Ports and FL_Ports, but disables it on E_Ports.

The incoming frame (3) is parsed and the S_ID contents (bits 23:0) of frame word 2 are presented to this circuitry. The frame S_ID Domain and Area (5), bits 23-8 of frame word 2, are compared against the Native ID Register (1) Domain and Area (6) in comparator (11). Match/mismatch is fed to gate (14).

If there is a miscompare, and Enable Hard Zoning (2) is active, then gate (10) specifies an invalid frame S_ID. In this case, the frame is not routed normally (it will never reach the intended destination), but is typically forwarded to the fabric manager for processing according to Fibre Channel rules for switches. This typically means that a Class 2 frame that fails the S_ID test spawns a response back to the sender with reason code, and that a Class 3 frame that fails the S_ID test is tossed.

If there is no miscompare in the frame S_ID, or if Enable Hard Zoning (2) is inactive, then gate (10) specifies that the frame will route normally, which means it will route to the fabric destination port specified by the frame D_ID.

This feature ensures that frames entering the fabric are not forwarded if the S_ID is illegal in any way.

Destination Fabric Port S_ID Validation

Figure 3:
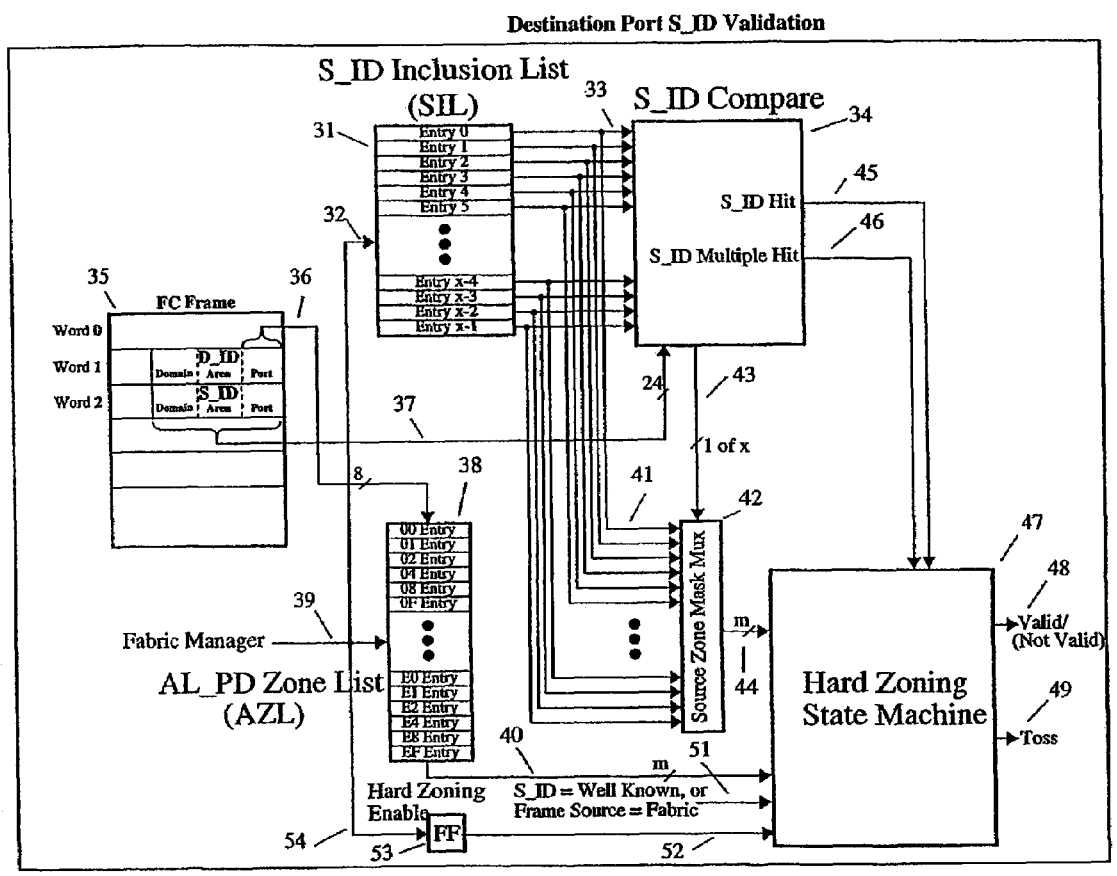
FIG. 3 is a block diagram of a portion of a fabric showing destination port S_ID validation according to one aspect of the invention.

Destination fabric port S_ID validation, described with reference to FIG. 3, ensures that outgoing frames are legal to send to the attached device(s). This feature requires an enable/disable control, because it should be enabled only on F_Ports and FL_Ports, but not on E_Ports.

Issues with Linear Tables.

Ideally, S_ID hard zoning would be performed in each host bus adapter (HBA) attached to the fabric. Each HBA would have its own unique zoning table. However, FC standards demand that zoning functions, hard and soft, be contained in the fabric.

A linear inclusion table would seem to be the most straightforward. However, to work for any address in the FC addressing range requires a very large table. For an F_Port, it would have an entry for every possible FC source address, which results in a depth of 256 Domains*256 Areas*256 Ports=16,777,216 table entries/port. If an FL_Port, the table has to also represent up to 126 loop devices, each of which may belong to different zones, which would require a unique linear inclusion table for each. The total number of inclusion table entries for an FL_Port would then be 256*256*256*126=2,113,929,216 table entries/port.

Shorter linear zone tables can be used, where a limited set of addresses, typically starting at the value Domain 1/Area 0, Port 0, and increasing sequentially up to the maximum table size implemented, can be economical. However, these tables cannot express any FC address and so greatly limits the fabrics that can be handled. For example, if the table had 512 entries, it could express all addresses in Domains 0x01 and 0x02, but none in Domain 0x03 through 0xEF.

The method described here utilizes a random table of 24-bit S_IDs, designed as CAM (Content Addressable Memory) where a frame S_ID can be compared against all CAM entries simultaneously seeking a comparison, or inclusion. Since the entries are 24-bit, the CAM can represent any FC address, but is limited to representing a subset of FC addresses far less than the FC maximum. For example, it could be expected that the CAM could economically hold 16-256 addresses, but could be less or more depending on the application and availability of resources.

The method has a single CAM per fabric port transmitter, even when the destination is an FL_Port, and so must work with as many as 126 loop destinations. For this reason, the CAM provides a source zone mask for each S_ID entry, which is compared against a destination zone mask contained in a separate lookup table.

There is a single destination zone mask table per fabric port transmitter, each entry representing a loop destination, or AL_PD, and which typically has an entry for every one of the 126 legal AL_PDs.

CAM-Based Inclusion Table.

This uses the S_ID Inclusion List (SIL), which describes which sources are allowed to send to this port, and if the destination is a loop, what zones each source belongs to.

It also uses the AL_PD Zone List (AZL), used only if the destination is a loop, which describes what zones a destination AL_PA belongs to.

The S_ID Inclusion List (SIL).

SIL (31) is a programmable list of 24-bit S_IDs deemed by the fabric manager to belong to the same zones as the port in question, where each entry also has a 2-bit Compare Mask and a Source Zone Mask. SIL is written by the fabric manager (32) based on zone information. SIL (31) can be any size, but typically would contain as many entries as is economically feasible, to allow as many sources as possible, and to cover as many topologies as possible. SIL (31) provides S_ID compare information (33) to S_ID Compare (34) and the source zone mask (41) to the Source Zone Mask Mux (42).

Figure 4:
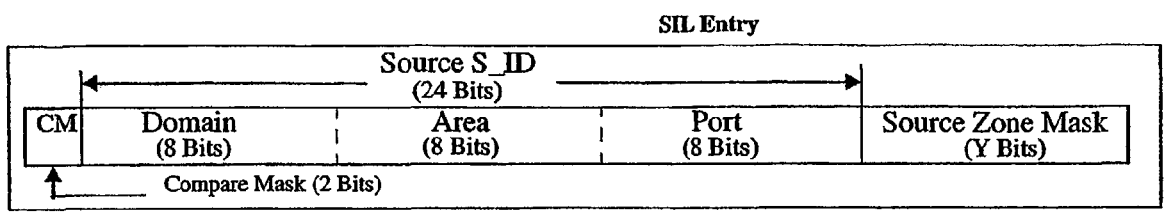
FIG. 4 is a diagram of a SIL (Source S_ID Inclusion List) entry which may be used in the validation of FIG. 3.

The Sil (31) entry format is shown in FIG. 4.

"Source S_ID" is 24 bits, and defines a legal source S_ID, if the "Compare Mask" value is not 00. Any S_ID within the FC address range of 0x0 -FFFFFF can be expressed.

"Source Zone Mask" is a bit mask of variable size, which defines which zone or zones the source belongs to. See Zone Mask explanation below.

"Compare Mask" defines how the compare against the frame S_ID is to take place

00=Slot not valid. No compare is possible against this entry.

01=No mask. Domain/Area/Port are compared [see note 1 below]

10=Mask Port. Domain/Area are compared [see note 2 below]

11=Mask Area and Port. Domain is compared [see note 3 below]

[note 1] The entry represents exactly 1 source.

[note 2] The entry could represent 126 sources.

[note 3] The entry could represent 256*126=32,256 sources.

S_ID Compare.

Figure 5:
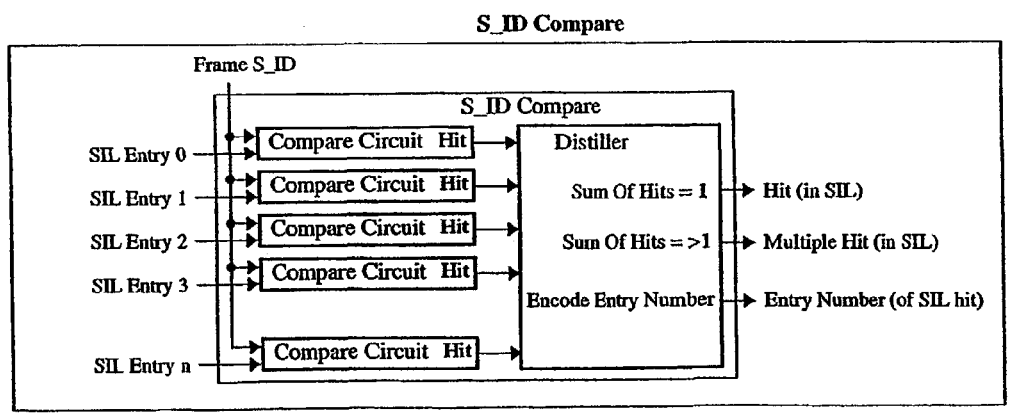
FIG. 5 is a block diagram of a portion of a fabric showing S_ID compare according to one aspect of the invention.

S_ID Compare (34) (see FIG. 5) is used to compare a frames' S_ID simultaneously to all entries in SIL (31) and present the results to the Hard Zoning State Machine (47). Each SIL (31) entry is compared against the frames S_ID (23:0) (37), using the S_ID value and Compare Mask of the SIL (31) entry (33). When a match is made, S_ID Compare (34) encodes the selected entry number into a value (43) that controls the Source Zone Mask Mux (42). The Hit (45) and Multiple Hit (46) status is shipped to the hard Zoning State Machine (47) for processing.

S_ID compare (34) distills the Hit/not status from every SIL entry compare as described above into a No Hit, Hit, or Multiple Hit status for the frame being processed. It also encodes the entry number of the hit into a binary value for use in the Source Zone Mask Mux.

Figures 6, 7:
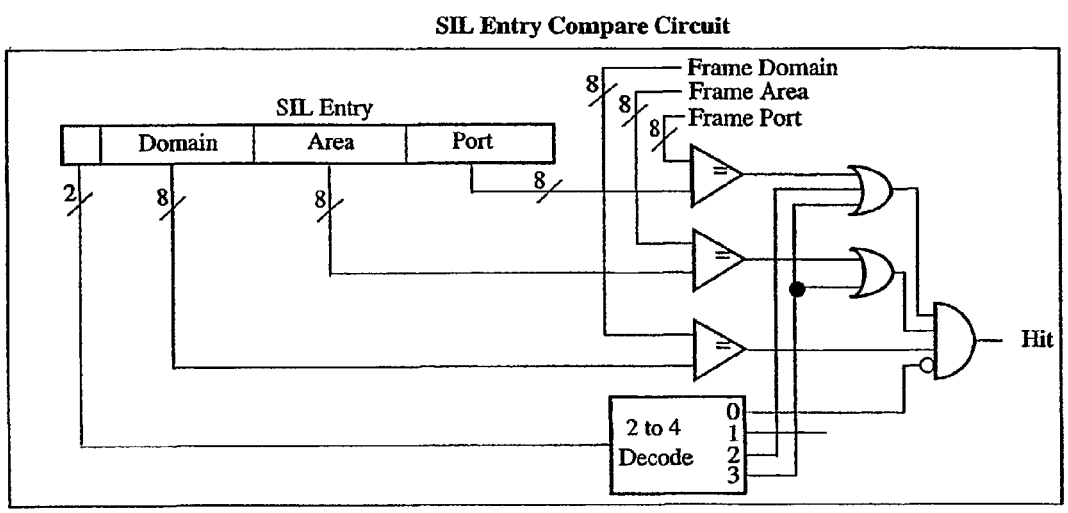
FIG. 6 is a block diagram of a portion of a fabric showing SIL entry compare according to one aspect of the invention.
FIG. 7 is a diagram showing the Source Zone Mask format.

There exists an autonomous compare circuit for every SIL entry, as shown in FIG. 6. The Hit/Not Hit output feeds the Distiller (see FIG. 5).

Distiller

The Distiller processes the results of SIL entry compares.

A Miss occurs when neither Hit nor Multiple Hit occurs. This causes the frame to be rejected.

A Hit occurs if a single entry compares. This is the first step in causing the frame to be accepted, the second being the SIL/AZL zone mask compare.

A Multiple Hit occurs if two or more entries compare. This causes the frame to be rejected. This is the way exceptions to ranges is implemented, and it also covers programming errors.

Entry Number is used on a Hit, to be a mux select for Source Zone Mask Mux.

Source Zone Mask Mux

The Source Zone Mask Mux (42) produces the zone mask associated with the source S_ID that matched the frame S_ID. The mux select (43) is produced by S_ID Compare (34) which is the encoded value of the SIL (31) entry that matched the frame S_ID. The Source Zone Mask Mux output (44) is given to the Hard Zoning State Machine (47) which will compare it against the destination zone mask (40).

The source zone mask can contain any number of bits, depending on how many zones a loop is designed to handle. For example, a 4-bit zone mask implies that a loop can have up to 4 zones, and an 8-bit mask allows 8 zones. The size of the source zone mask in SIL (31) must be identical to the size of the destination zone mask in AZL (38).

The AL PD Zone List (AZL)

AZL (38) (FIG. 3) is a 126-entry programmable table, one entry for every legal AL_PA, that contains the zone mask for each destination loop port. The frame AL_PD (36) provides the address to AZL (38), which produces the destination zone mask (40), which is given to the Hard Zoning State Machine (47) which will compare it against the source zone mask (44). AZL is written by the fabric manager (39) based on zone information. In order that the loop not be restricted in the choice of assignable AL_PAS, it is desirable for AZL to have 126 entries, one for each legal AL_PA. Fewer entries are possible if restricting the AL_PA range is acceptable.

The destination zone mask can contain any number of bits, depending on how many zones a loop is designed to handle. For example, a 4-bit zone mask implies that a loop can have up to 4 zones, and an 8-bit mask allows 8 zones. The size of the destination zone mask in AZL (38) must be identical to the size of the source zone mask in SIL (31).

Hard Zoning Enable

The Hard Zoning Enable (53)(FIG. 3) is a storage element programmed to enable or disable hard zoning on the port, and is written by the fabric manager (54) based on zoning and topology information. If hard zoning is employed in the fabric cloud, this will be set active on F_Ports and FL_Ports, and inactive on E_Ports.

The state of Hard Zoning Enable (52) is fed to the Hard Zoning State Machine (47) to condition the function. Hard Zoning Enable (52) is unique to the port, and is the same storage element that enables/disables S_ID validation on incoming frames.

The Hard Zoning State Machine

The Hard Zoning State Machine (47) (FIG. 9) determines the disposition of all frames attempting to exit the fabric at a particular port.

If Hard Zoning is disabled;
   All frames pass this function and, in lieu of other fabric functions, are forwarded out of the fabric to the destination node.

If Hard Zoning is enabled;
   If the frame S_ID is in the range of 0xFxxxxx-FFFFFF, or if the frame originated in the switch box processor complex, hard zoning is ignored and the frame is routed normally.
   If the port is an F_Port, only the S_ID compare is required. In this case, zone masks are logically irrelevant, but all zone masks in the SIL and all zone masks in AZL are set to some value (hex FF for example) that guarantees a zone mask compare in all cases. Note that the design could be implemented where an F_Port could disable the zone mask compare to avoid having to program the zone masks.
   If the port is an FL_Port, the compare is the same, but the zone masks are now relevant and must be programmed according to the actual zones in use.
   If there is a hit in SIL, but the SIL zone mask=00, the frame is invalid. This is a deliberate way to reject known bad sources.
   If there is a multiple hit in SIL, the frame is invalid. This implements the Exception To A Range function.

The Source Zone Mask (62) is provided by the Source Zone Mask Mux (42). The Destination Zone Mask (63) is provided by AZL (38). A bit-wise compare is made between the two masks in AND gates (66), all of which are ORed together in gate (67), which is active if any bit pair is set, and inactive if no bit pairs are set.

Function (68) is active if all source zone mask bits are zero. This is the test for a known bad S_ID that has been tagged in this way to insure its immediate tossing.

S_ID Hit (60) and S_ID Multiple Hit (61) are from S_ID Compare (34). Hard Zone Enable (65) is from the storage element of the same name (52). The translation for S_ID=0xFxxxxx+Frame Source=Fabric Manager (64) is made locally.

AND gate (69) commands the unconditional toss of frames whose source zone mask=0.

AND gate (70) commands that a frame is valid because it passes the general hard zoning test.

AND gate (71) commands the general frame valid.

EXAMPLE A

Multiple Hosts on F_Ports Connected to Multiple Storage Devices on FL_Ports

The diagram in FIG. 10 depicts two hosts attached to a switch that is the access to their storage. Hard zoning is set up so that Host A can only access disks in zone A, and Host B can only access disks in zone B. Host A and Host B can also access each other, and Host A and Host B share access to some disks. Zone masks have bit 0 assigned to zone A and bit 1 assigned to zone B.

The programmable values for each fabric port is as follows.

Port 01,00 (Domain 01, Area 00): Host A

TABLE 1

Example A SIL Contents

| SIL Entry | Compare Mask (bin) | Domain Value (hex) | Area Value (hex) | Port Value (hex) | Source Zone Mask (hex) | Comment |
|---|---|---|---|---|---|---|
| 0 | 02 | 01 | 03 | xx | FF | Host B |
| 1 | 01 | 01 | 01 | 04 | 01 | Loop x, alpa = 04 (belongs in zone A) |
| 2 | 01 | 01 | 01 | 05 | 03 | Loop x, alpa = 05 (belongs in zones A) & B) |
| 3 | 01 | 01 | 02 | 03 | 01 | Loop y, alpa = 03 (belongs in zone B) |

TABLE 2

Example A AZL Contents

| AZL Entry (hex) | Dest Zone Mask (hex) | Comment |
|---|---|---|
| All | FF | |

Port 01,01 (Domain 01, Area 01): Loop X

TABLE 3

Example A SIL Contents

| SIL Entry | Compare Mask (bin) | Domain Value (hex) | Area Value (hex) | Port Value (hex) | Source Zone Mask (hex) | Comment |
|---|---|---|---|---|---|---|
| 0 | 02 | 01 | 00 | xx | 01 | Host A (belongs to zone A) |
| 1 | 02 | 01 | 03 | xx | 02 | Host B (belongs to zone B) |

TABLE 4

Example A AZL Contents

| AZL Entry (hex) | Dest Zone Mask (hex) | Comment |
|---|---|---|
| 04 | 01 | belongs to zone A |
| 05 | 03 | belongs to zone A and B |
| 06 | 02 | belongs to zone B |
| Others | 00 | |

Port 01,02 (Domain 01, Area 02): Loop Y

TABLE 5

Example A SIL Contents

| SIL Entry | Compare Mask (bin) | Domain Value (hex) | Area Value (hex) | Port Value (hex) | Source Zone Mask (hex) | Comment |
|---|---|---|---|---|---|---|
| 0 | 02 | 01 | 00 | xx | 01 | Host A (belongs to zone A) |
| 1 | 02 | 01 | 03 | xx | 02 | Host B (belongs to zone B) |

TABLE 6

Example A AZL Contents

| AZL Entry (hex) | Dest Zone Mask (hex) | Comment |
|---|---|---|
| 01 | 02 | belongs to zone B |
| 02 | 02 | belongs to zone B |
| 03 | 01 | belongs to zone A |
| Others | 00 | |

Port 01,03 (Domain 01, Area=03): Host B

TABLE 7

Example A SIL Contents

| SIL Entry | Compare Mask (bin) | Domain Value (hex) | Area Value (hex) | Port Value (hex) | Source Zone Mask (hex) | Comment |
|---|---|---|---|---|---|---|
| 0 | 02 | 01 | 00 | xx | FF | Host A |
| 1 | 01 | 01 | 01 | 06 | 02 | loop x, alpa = 06 (belongs to zone B) |
| 2 | 01 | 01 | 01 | 05 | 03 | loop x, alpa = 05 (belongs to zone A and B) |
| 3 | 01 | 01 | 02 | 02 | 02 | loop y, alpa = 02 (belongs to zone B) |
| 4 | 01 | 01 | 02 | 01 | 02 | loop y, alpa = 01 (belongs to zone B) |

TABLE 8

Example A AZL Contents

| AZL Entry (hex) | Dest Zone Mask (hex) | Comment |
|---|---|---|
| All | FF | |

Configured as described above, the desired hard zoning for Example A, FIG. 10 is acheived.

EXAMPLE B

Wild Carding

Figure 11:
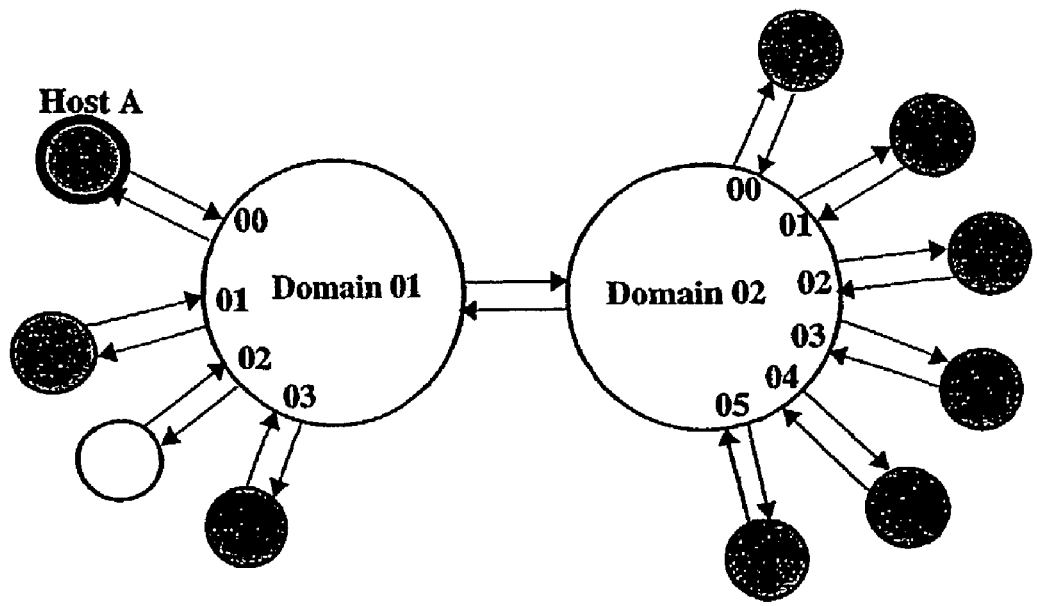
FIG. 11 is a diagram of an example (Example B) of the use the technique of wild carding, in connecting multiple hosts to multiple storage devices with hard zoning.

The example in FIG. 11 depicts how a single wild-carded SIL entry can represent all devices in a Domain. This shows Host A's view of the hard zoning, where some of the other ports in the same Domain are in zone A, and all of the ports in the other Domain are part of zone A.

Port 01,03 (Domain 01, Area=00): Host A

TABLE 9

Example B SIL Contents

| SIL Entry | Compare Mask (bin) | Domain Value (hex) | Area Value (hex) | Port Value (hex) | Source Zone Mask (hex) | Comment |
|---|---|---|---|---|---|---|
| 0 | 02 | 01 | 01 | xx | FF | device on Domain 1, Area 1 |
| 1 | 02 | 01 | 03 | xx | FF | device on Domain 1, Area 3 |
| 2 | 03 | 02 | xx | xx | FF | all devices on Domain 2 |

TABLE 10

Example B AZL Contents

| AZL Entry | Dest Zone Mask | Comment |
|---|---|---|
| All | FF | |

Configured as described above, the desired hard zoning for Example B, FIG. 11 is acheived. Note that this example shows how an entire Domain can be represented by one entry. This same method can be used to represent an entire Domain/Area with one entry, which allows all Ports to be represented with one entry.

EXAMPLE C

Wild Carding with Exceptions

Figure 12:
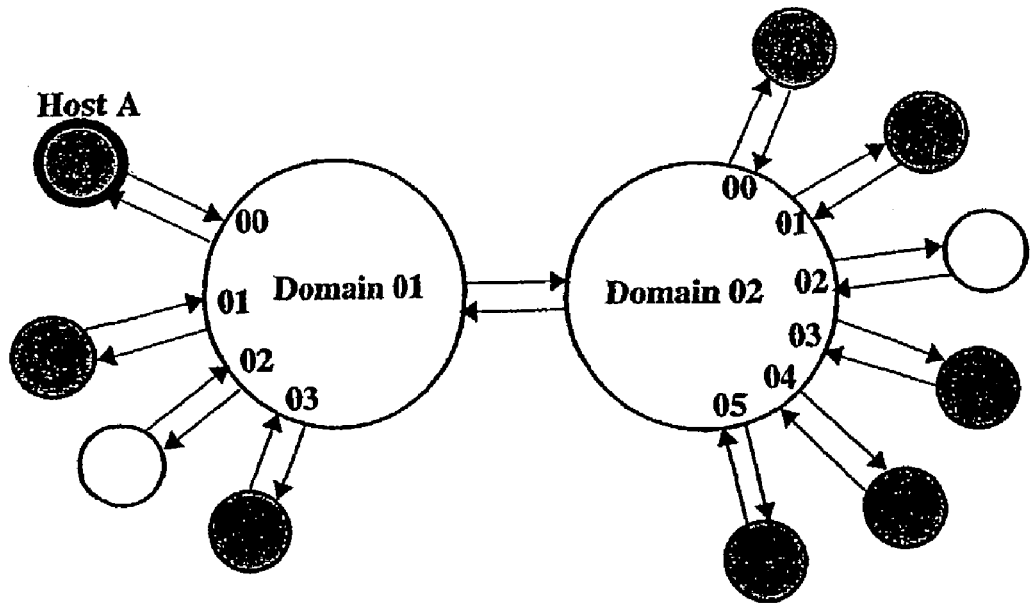
FIG. 12 is a diagram of an example (Example C) of the use the technique of wild carding with exceptions, in connecting multiple hosts to multiple storage devices with hard zoning.

The example in FIG. 12 depicts the same topology as for Example B but with an exception to a wild card. This shows Host A's view of the hard zoning, where some of the other ports in the Same Domain are in zone A, and most but not all of the ports in the other Domain are part of zone A.

Port 01, 03 (Domain 01, Area=00): Host A

TABLE 11

Example C SIL Contents

| SIL Entry | Compare Mask (bin) | Domain Value (hex) | Area Value (hex) | Port Value (hex) | Source Zone Mask (hex) | Comment |
|---|---|---|---|---|---|---|
| 0 | 02 | 01 | 01 | xx | FF | device on Domain 1, Area 1 |
| 1 | 02 | 01 | 03 | xx | FF | device on Domain 1, Area 3 |
| 2 | 03 | 02 | xx | xx | FF | all devices on Domain 2 |
| 3 | 02 | 02 | 02 | xx | FF | exception to Domain 2 (exception) |

TABLE 12

Example C AZL Contents

| AZL Entry | Dest Zone Mask | Comment |
|---|---|---|
| All | FF | |

Configured as described above, the desired hard zoning for Example C, FIG. 12 is acheived. Note that 4 entries represent 7 sources. Note also that this shows wild carding a Domain with a single entry, but uses additional entries for exceptions to that Domain. This can also be used to wild card a Domain/Area, which covers all Ports, but use additional entries for each Port exception to the Domain/Area.

It will be seen from the above description that the present invention provides improved FC switch techniques, by providing roubust hardware-enforced zoning for data integrity and security. While specific embodiments and techniques have been described, it will be appreciated that the invention is not limited to those specific embodiments, and that many variations are possible within the scope of the invention.

What is claimed is:

1. A method of hard-zoning protection for loop-level addresses in Fibre Channel switching, comprising:
   receiving a frame at a port of a Fibre Channel fabric;
   comparing the S_ID of the frame to the native ID of the port, and based on the comparison, routing a valid frame to its destination F_Port or FL_Port;
   at the destination port, comparing the frame's S_ID to an inclusion list of sources permitted under the zoning to transmit to the destination port and for loop-level addresses, comparing the zone of the destination and the zone of the source;
   for valid frames, transmitting the frame through the destination port to the attached device or loop of devices.

2. A method according to claim 1 wherein the step of comparing the frame S_ID to an inclusion list includes simultaneous comparison of S_IDs using a content addressable memory associated with the destination port.

3. A method according to claim 1 wherein there are multiple zones per loop attached to the destination port in the comparison of source and destination zones.

4. A method according to claim 1 wherein there are multiple overlapping zones per loop attached to the destination port in the comparison of source and destination zones.

5. A method according to claim 1 wherein the inclusion list can express wild card designations to disable the comparison of Fibre Channel Port value or Fort and Area value.

6. A method according to claim 1 wherein the inclusion list may have an entry defining a range of S_ID values, and additional entries defining exceptions to the range, and wherein the comparison of permitted S_IDs is based on the range and exceptions.

7. A Fibre Channel switch, comprising:
   a port connectable as a source port to receive frames;
   an S_ID validator associated with the source port and operable to compare the frame S_ID to the native ID or the source port when used as a F_Port or FL_Port, and operative to route valid frames through the switch fabric;
   a port receiving a frame routed through the fabric as a destination F_Port or FL_Port having a unique inclusion table of valid S_IDs and zones for devices and loop devices attached to the port according to defined zoning;

destination port S_ID validator operably associated with the destination port to compare S_ID and zones of frames routed to it through the fabric against the inclusion table and to transmit only frames with valid sources and zones to the devices and loop devices attached to the port.

8. A Fibre Channel switch according to claim 7 wherein the destination port S_ID validator includes a content addressable memory operative to simultaneously compare the frame S_ID to entries in an inclusion table.

9. A Fibre Channel switch according to claim 7 wherein the defined zoning includes multiple zones per loop attached to the destination port.

10. A Fibre Channel switch according to claim 7 wherein the defined zoning includes multiple overlapping zones per loop attached to the destination port.

11. A Fibre Channel switch according to claim 7 wherein the inclusion table can express wild card designations and wherein the destination port validator is operable in response thereto to disable the comparison of Fibre Channel Port value or Port and Area value.

12. A Fibre Channel switch according to claim 7 wherein the inclusion table can express a designation defining a range of S_ID values and additional entries defining exceptions to the range, and wherein the destination port validator is operable in response thereto accept the range but not the exceptions.

* * * * *